United States Patent [19]

Steier et al.

[11] 4,152,254
[45] May 1, 1979

[54] DISK CENTRIFUGE FOR GRANULAR MATERIAL

[75] Inventors: Klaus Steier, Munich; Wolfram Quittkat, Gauting; Wulfram Schmid-Meil, Arnbach; Otmar Hornberger, Feldgeding, all of Fed. Rep. of Germany

[73] Assignee: Krauss-Maffei Aktiengesellschaft, Munich, Fed. Rep. of Germany

[21] Appl. No.: 850,386

[22] Filed: Nov. 10, 1977

[30] Foreign Application Priority Data

Nov. 11, 1976 [DE] Fed. Rep. of Germany ...... 2651383
Oct. 11, 1977 [DE] Fed. Rep. of Germany ...... 2745653

[51] Int. Cl.² .................................... D07B 7/083
[52] U.S. Cl. .................................... 209/148; 209/136; 233/40; 406/71
[58] Field of Search .............. 209/120, 144, 148, 150, 209/153, 138, 139 A, 133, 672, 136, 137; 198/642; 302/60, 61, 38

[56] References Cited

U.S. PATENT DOCUMENTS

| 588,908 | 8/1897 | Heslop | 302/38 |
|---|---|---|---|
| 655,792 | 7/1900 | Dusconaguerre | 209/120 |
| 1,577,769 | 3/1926 | Street | 302/61 |
| 1,785,918 | 12/1930 | Stebbins | 209/144 X |
| 2,003,141 | 5/1935 | Vorfan | 209/150 |
| 2,352,677 | 7/1944 | Anderson | 302/61 X |
| 2,546,068 | 3/1951 | Oustavsson | 209/148 X |
| 3,520,407 | 7/1970 | Rumpf | 209/148 X |

FOREIGN PATENT DOCUMENTS

| 560279 | 9/1957 | Belgium | 209/148 |
|---|---|---|---|
| 920901 | 10/1954 | Fed. Rep. of Germany | 209/144 |
| 1454444 | 11/1976 | United Kingdom | 209/148 |

Primary Examiner—Robert Halper
Attorney, Agent, or Firm—Karl F. Ross

[57] ABSTRACT

A centrifuge for sifting granular material, ranging in particle size from a few microns to several hundred microns, for example, comprises an upwardly concave frustoconical disk rotatable about a horizontal axis and provided with a similarly shaped cover defining therewith a narrow annular gap of outwardly converging radial cross-section. Air, or some other gaseous or liquid fluid, is axially introduced from above into that gap together with the granular material to be centrifuged, the fluid stream imparting to the smaller particles an added acceleration making the velocities of all particles substantially equal at the disk periphery.

6 Claims, 5 Drawing Figures

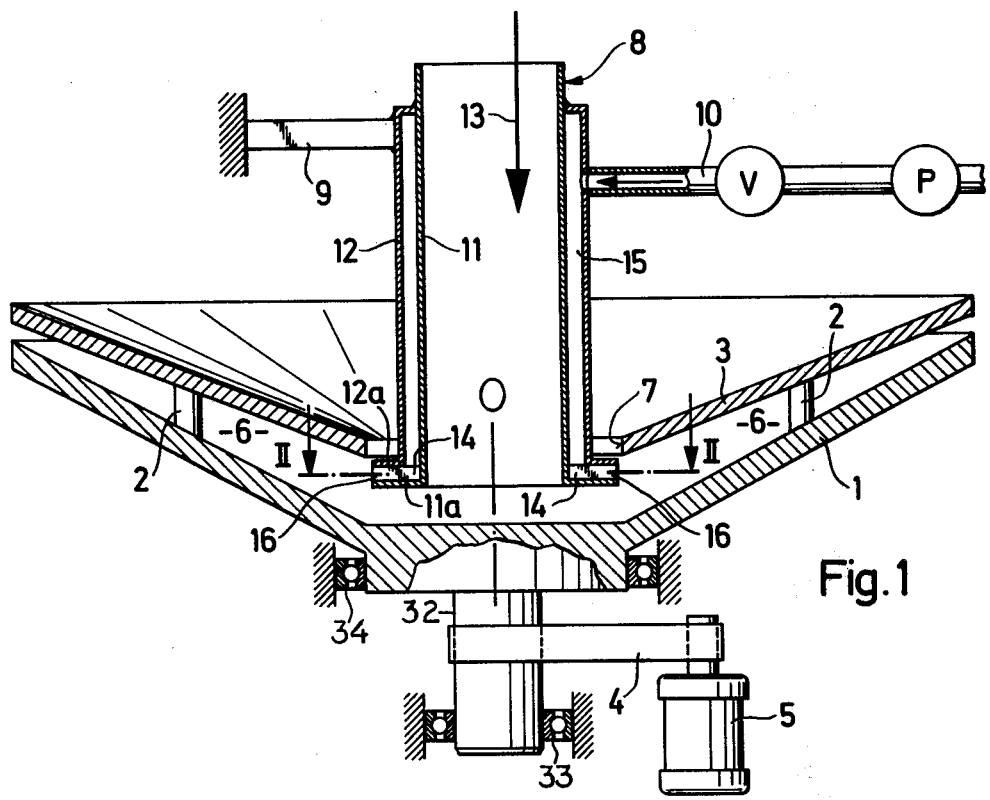

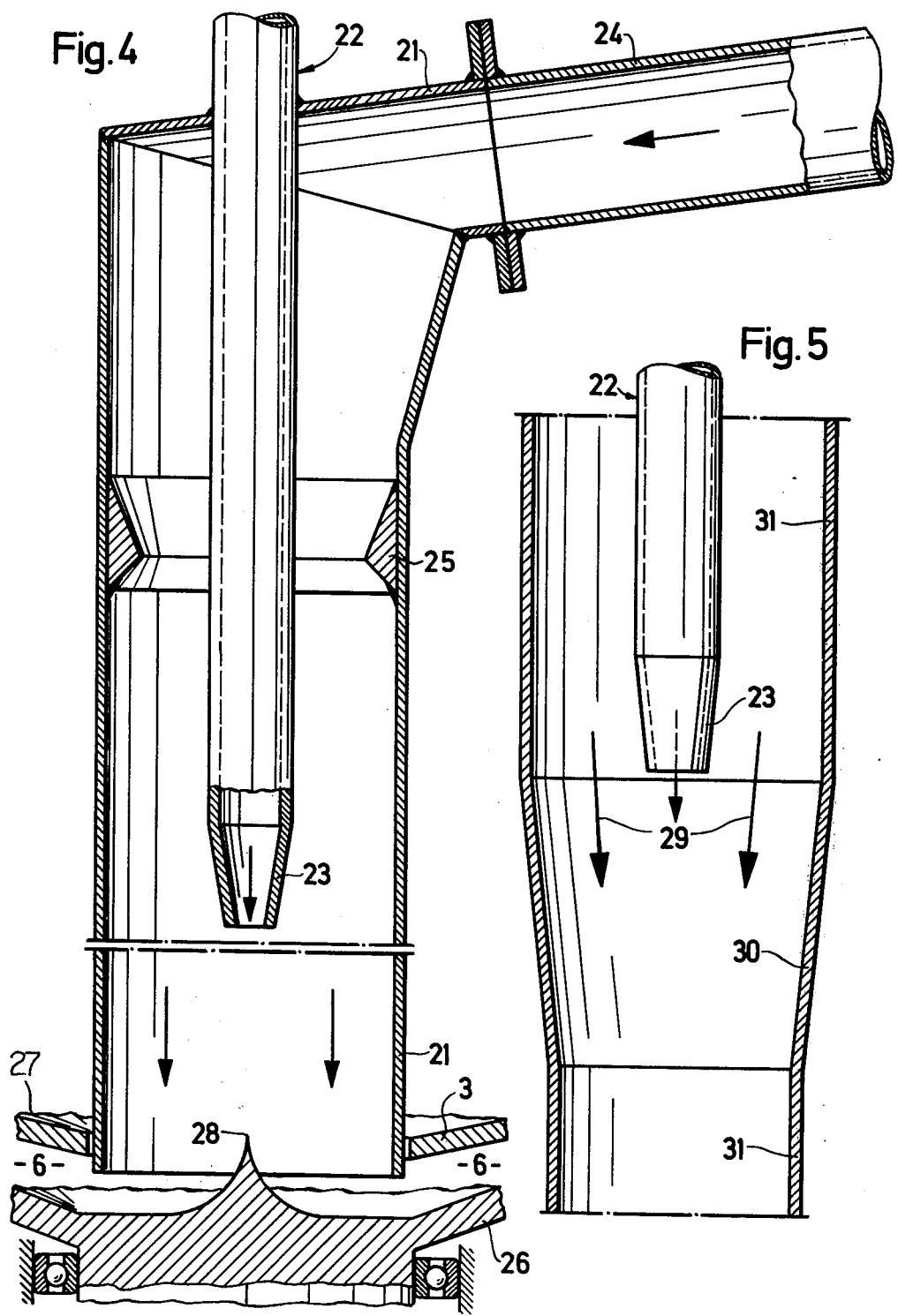

DISK CENTRIFUGE FOR GRANULAR MATERIAL

FIELD OF THE INVENTION

Our present invention relates to an apparatus for the centrifuging of granular material, e.g. as part of an air sifter designed to separate particles of different sizes.

BACKGROUND OF THE INVENTION

Devices of this description generally comprise a disk or platter, rotatable about a vertical axis, on whose upper surface the granular material to be sifted is continuously deposited. The particles coming to rest on the disk are rotatably entrained and are radially accelerated by the centrifugal force, thus leaving the disk periphery with a velocity which should be sufficient to carry the heavier particles across a rising air stream while the lighter ones are swept up and directed into a separate channel. Such a device is know, for example, from U.S. Pat. No. 2,913,109.

According to other prior proposals (see, for example, German Pat. No. 1,456,798) the centrifuging platter or slinger disk is spacedly overlain by a cover rotating jointly therewith, the particulate material being ejected through a narrow annular gap formed between the disk and the cover.

For effective separation by an air sifter surrounding the disk, it is desirable that all particles exiting from the gap initially follow substantially the same trajectory regardless of size. With particle sizes spread over a wide range, e.g. from a few microns to several hundred microns, this goal is not easily attained since the frictional contact between the particles and the disk surface increases with particle size so that the larger and heavier particles are more readily entrained, and therefore accelerated, than the others. This is especially true where, for more intense acceleration with a given energy input, the upper disk surface is of upwardly concave frustoconical shape so that the contact between that surface and the particles is enhanced by the centrifugal force acting thereon.

Slinger disks have also been provided in the past with a set of upstanding radial webs for more positive rotative entrainment of the deposited particles. The presence of these webs, however, tends to bunch the ejected particles in a number of peripherally separated streams, particularly if the webs extend all the way to the disk periphery, with resulting lower efficiency of the associated air sifter. If the webs terminate short of the disk periphery, marked differences in acceleration are again observed.

OBJECT OF THE INVENTION

The object of our present invention, therefore, is to provide an improved apparatus of the character described in which particles of different sizes leave an annular acceleration gap between a slinger disk and a corotating cover at more or less the same velocity.

SUMMARY OF THE INVENTION

A centrifuging apparatus according to our invention comprises supply means opening axially from above into an annular gap between a slinger disk and a cover rotating jointly therewith, in combination with circulation means for generating a continuous fluid flow from the vicinity of the disk axis outwardly through the gap during rotation of the disk. The smaller particles in a comminuted mass, deposited by the supply means on the upper disk surface, are preferentially entrained by this fluid flow to compensate at least in part for the more intense centrifugal acceleration of the larger particles.

The circulating fluid, which could be gaseous or liquid but which for convenience will be referred to hereinafter as air, advantageously enters the gap together with the particulate mass through a pair of coaxial conduits which could be stationary or rotating with the disk. The air may pass through an annular flow channel formed between the two conduits, in which case we prefer to provide that channel with a generally radial annular outlet between the disk and the cover. Alternatively, the inner conduit may be used as an air tube while the outer one serves for the introduction of the granular material.

Pursuant to another advantageous feature of our invention, the air entering the acceleration gap is set in rotary motion codirectionally with the disk and its cover, e.g. by a set of vanes in the aforementioned flow channel. Such rotation lets the air pass over the disk surface along a trajectory, in the general form of an Archimedean spiral, approximating the path of the accelerated particles which are thereby more effectively impelled by the air flow.

It should be noted that the use of air circulation in a particle separator has already been suggested in the aforementioned U.S. Pat. No. 2,913,109 but only for the purpose of forming an air seal between the rotating disk structure and a stationary supply tube for the granular material.

The circulation of the air flow through the acceleration gap may be promoted by a blower or pump, though in some instances the air may be simply aspirated by the centrifugal force acting upon it within the gap. Since even the larger particles experience some acceleration by the air flow, its presence allows the use of smaller slinger disks for a desired accelerating effect.

The air traversing the annular gap also serves to keep the disk surface clean, especially if that surface is provided with radial webs (although, for the aforestated reasons, we prefer to keep the gap substantially unobstructed at least near its outer periphery).

BRIEF DESCRIPTION OF THE DRAWING

The above and other features of our invention will now be described in detail with reference to the accompanying drawing in which:

FIG. 1 is an axial sectional view of a centrifuging apparatus according to our invention;

FIG. 2 is an axial-sectional veiw taken on the line II—II of FIG. 1;

FIG. 3 is a top view of a modified air inlet for the apparatus shown in FIG. 1; and FIGS. 4 and 5 are fragmentary axial sectional views of further modifications, drawn to a larger scale.

SPECIFIC DESCRIPTION

In FIG. 1 we have shown a slinger disk 1 with a frustoconical, upwardly concave upper surface spacedly overlain by a similarly shaped cover 3, the disk and the cover being interconnected by a small number of stays 2 so that the intervening annular gap 6 is substantially unobstructed. The assembly of disk 1 and cover 3 has a vertical shaft 32 journaled in a stationary frame by bearings 33 and 34, the shaft being driven counterclockwise (as viewed in FIG. 2) by an electric motor 5 via a belt 4.

Cover 3 is formed with a central opening 7 giving passage to a stationary supply unit 8 which is supported by one or more arms 9 on the stationary housing of the apparatus. Unit 8 comprises an inner conduit 11 and an outer conduit 12 centered on the disk axis 0, an intervening annular channel 15 communicating with a source of compressed air comprising a pump P in a branch line 10 provided with a control valve V.

The inner conduit 11 serves as a hopper for granular material (not shown) fed in from above as schematically indicated by an arrow 13. The opening 7 may be sealed against unit 8 by a suitable air seal which may be provided by part of the circulating air itself, as in the system of U.S. Pat. No. 2,913,109, though other closure means such as a labyrinth seal could also be provided.

Channel 15 terminates just below opening 7 in a radial annular outlet 16, defined by axially spaced transverse extensions 11a, 12a of conduits 11, 12, whereby the entering air is ejected directly and omnidirectionally into the surrounding gap 6. Advantageously, as best seen in FIG. 2, that outlet is provided with a set of vanes 14 extending skew to the disk axis so as to impart a vortex motion to the air flow, setting it in rotation codirectionally with disk 1 and cover 3 as indicated by an arrow 17 in FIG. 2.

As seen in FIG. 3, such codirectional rotation can also be achieved by introducing the air (arrow 18) tangentially, via a tube 19, into an annular channel between inner and outer conduits 11b and 12b of a supply unit 20.

Advantageously, as shown, the confronting surfaces of disk 1 and cover 3 converge in a radially outward direction so that the gap 6 narrows progressively toward the disk periphery. The extent of this convergence should be so chosen that the peripheral cross-section of the gap 6 (i.e. its circumference multiplied by its axial height) diminishes with increasing radius or at least remains substantially constant, thus preventing any decrease in the radial velocity of the air flow originating near the disk axis.

In another supply unit shown in FIG. 4, a conduit 21 coaxially surrounds an air tube 22 terminating well above the lower end of that conduit in a downwardly converging nozzle 23. An extension 24 of conduit 21 forms a chute for the introduction of the granular material to be centrifuged. An annular insert 25 welded to the inner surface of conduit 21 defines with tube 22 a constriction checking the descent of the comminuted mass; the latter, passing through conduit 21, is thus subjected to the action of the air stream even before reaching the surface of a slinger disk 26 which has a flow-deflecting tip 28 axially rising from that surface. Tip 28, pointing toward nozzle 23, has an effect similar to that of outlet 16 (FIG. 1) in directing the oncoming air stream radially outwardly into the surrounding centrifugation gap. Disk 26 is overlain by an apertured cover 27 rotating jointly therewith.

In FIG. 5 the outer conduit 21 has been replaced by a tube 31 having a downwardly converging neck 30 just below nozzle 23. The comminuted mass entering that neck, as indicated by an arrow 29, is more effectively accelerated by this convergence at the point where the air stream arriving through conduit 22 impinges upon it. In this case, too, the underlying disk surface may be provided with a flow deflector as shown in FIG. 4.

We claim:
1. In an apparatus for centrifuging granular material, including a slinger disk spacedly overlain by a cover and defining therewith a narrow annular gap centered on an axis, drive means for jointly rotating said disk and said cover about said axis, an inner conduit opening axially from above into said gap for depositing differently sized particles of granular material on an upper surface of said disk with resulting centrifugal acceleration of said particles in a radially outward direction within said gap, an outer conduit surrounding said inner conduit and forming therewith an annular channel opening into said gap, and a source of fluid communicating with said channel for setting up in said gap a continuous outwardly directed fluid flow preferentially entraining smaller particles to compensate at least in part for the more intense centrifugal acceleration of larger particles, the improvement wherein both said conduits are stationary and said channel has an outlet provided with a set of stationary vanes imparting to said fluid flow a rotation codirectional with that of said disk.

2. The improvement defined in claim 1 wherein said gap narrows in a radially outward direction to such an extent that its peripheral cross-section does not increase with radius.

3. The improvement defined in claim 1 wherein said disk and said cover have generally frustoconical, upwardly concave confronting surfaces.

4. The improvement defined in claim 1 wherein said gap is substantially unobstructed at least along its outer periphery.

5. The improvement defined in claim 1 wherein said outlet is formed by axially spaced transverse extensions of said inner and outer conduits, said vanes being disposed between said extensions.

6. The improvement defined in claim 5 wherein said extensions lie above said disk and below said cover.

* * * * *